United States Patent [19]

Barnett et al.

[11] 4,262,047
[45] Apr. 14, 1981

[54] FIBERGLASS UTILITY POLE CROSSARM

[76] Inventors: George D. Barnett, 110 Pennsylvania; Gary L. Barnett, 1443 Avenue A, both of Graham, Tex. 76046

[21] Appl. No.: 89,472

[22] Filed: Oct. 30, 1979

[51] Int. Cl.³ .............................................. B32B 3/12
[52] U.S. Cl. ...................................... 428/73; 52/40; 52/697; 52/806; 428/116
[58] Field of Search ............... 428/73, 116, 118, 117; 52/806, 697, 40; 174/45 R

[56] References Cited

U.S. PATENT DOCUMENTS

| | | | |
|---|---|---|---|
| 2,477,852 | 8/1949 | Bacon | 156/189 X |
| 3,013,584 | 12/1961 | Reed et al. | 428/73 X |
| 3,211,253 | 10/1965 | Gonzalez | 428/116 X |
| 3,235,652 | 2/1966 | Lindsey | 174/45 R |
| 3,248,275 | 4/1966 | Lincoln | 428/116 |
| 3,327,441 | 6/1967 | Kelly | 52/587 X |
| 3,380,206 | 4/1968 | Barnett | 428/73 X |
| 3,450,593 | 6/1969 | Fossier et al. | 428/73 |
| 3,531,578 | 9/1970 | Dey | 52/697 X |
| 3,564,798 | 2/1971 | Darby et al. | 428/116 X |
| 3,587,479 | 6/1971 | Geschwender | 428/73 X |
| 3,888,531 | 6/1975 | Straza et al. | 428/116 X |

Primary Examiner—Henry F. Epstein
Attorney, Agent, or Firm—Harvey B. Jacobson

[57] ABSTRACT

A generally horizontal log of fiberglass honeycomb material defining side-by-side upstanding adjacent cells substantially throughout the log is provided and the log includes a hard outer covering enclosing the log on all sides. The covering is bonded to the opposing side surfaces of the log and the opposite ends of the log include vertical bores therethrough having thrust sleeves of substantially the same length tightly received in and extending through the vertical bores. The hard outer covering of the log is comprised of resin impregnated fiberglass roving and includes an outer layer of fiberglass resin sprayed or flowed over the covering.

2 Claims, 4 Drawing Figures

U.S. Patent    Apr. 14, 1981    4,262,047
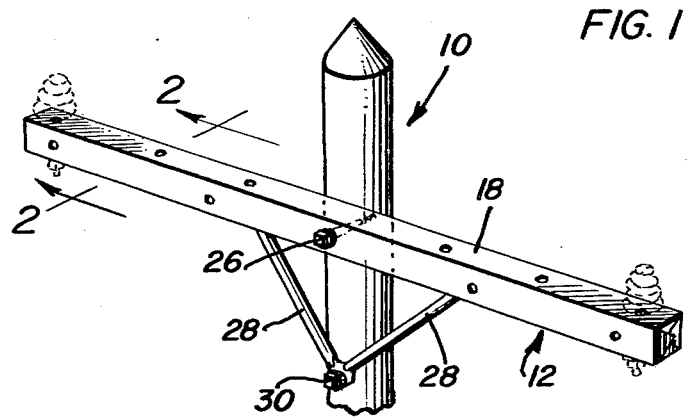
FIG. 1
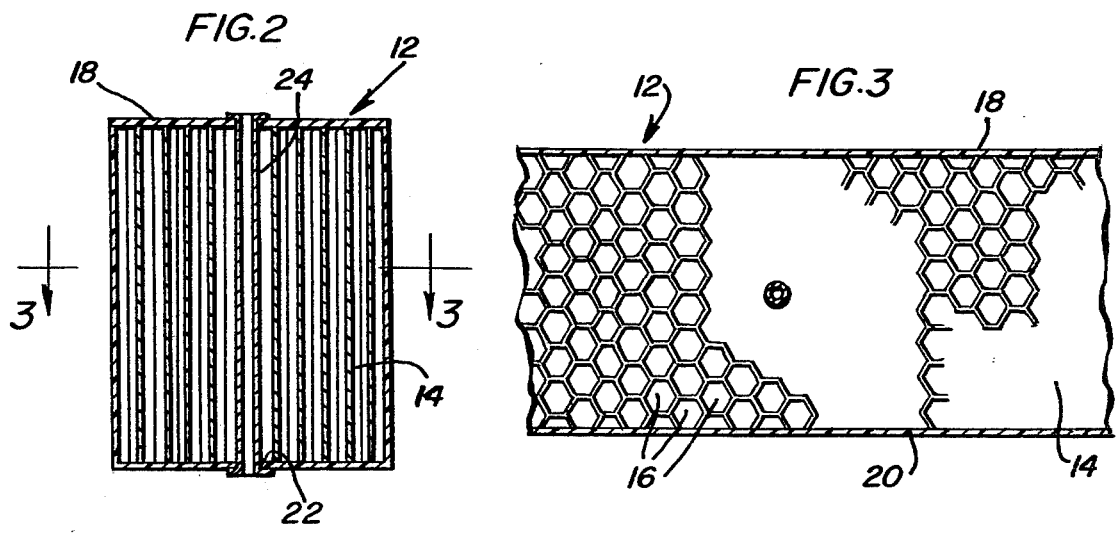
FIG. 2
FIG. 3
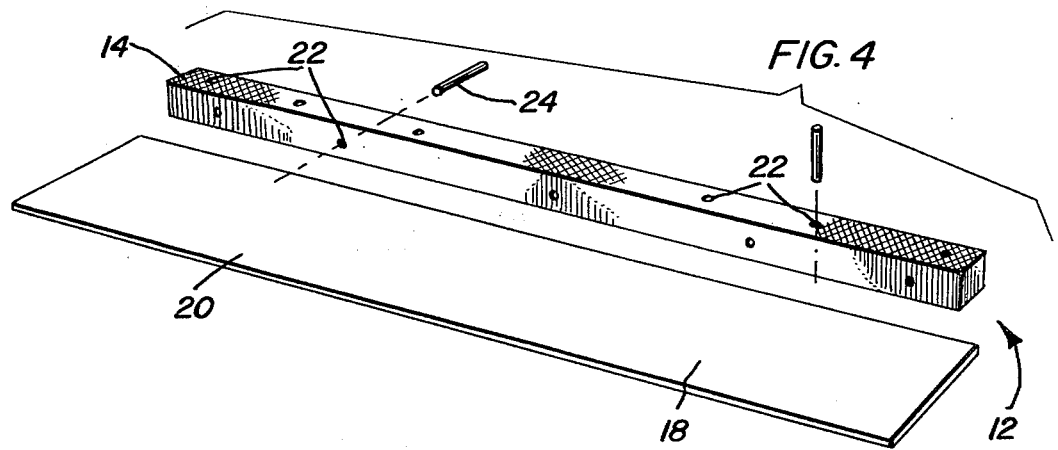
FIG. 4

FIBERGLASS UTILITY POLE CROSSARM

BACKGROUND OF THE INVENTION

Utility pole crossarms are subject to rotting and are heavy. Thus, when wooden conventional utility ple crossarms need to be replaced considerable manual effort is required not only in the removal of the original crossarm to be replaced but also the installation of the replacement crossarm. This considerable manual effort includes numerous man hours of labor and in addition also requires the utilization of motor driven lift equipment. Further, when a utility pole crossarm needs to be replaced, the utility wires supported from the crossarm often must have the current passing therethrough turned off resulting in considerable down time and inconvenience to electric utility customers.

Accordingly, a need exists for a utility pole crossarm which will have a substantially indefinite life span and which will be considerably lighter and easier to install.

Various forms of plastic and styrofoam crossarms and support members including some of the general structural and operational features of the instant invention are disclosed in U.S. Pat. Nos. 3,013,584, 3,235,652, 3,327,441 and 3,531,578. However, these previously known forms of plastic and fiberglass structures are not well suited for replacement purposes in lieu of conventional wooden utility pole crossarms, nor do they couple the advantages of light weight construction and a substantially indefinite life span.

BRIEF DESCRIPTION OF THE INVENTION

The utility pole crossarm of the instant invention comprises a horizontal log of honeycomb fiberglass material defining side-by-side upstanding adjacent cells and the log is enclosed within a resin impregnated fiberglass cover having an outer layer of resin sprayed or flowed thereover. The resultant crossarm is thus considerably lighter, easier to handle, non-conductive, considerably more fireproof than treated wood crossarms and not adversely effected by temperature and moisture conditions.

The main object of this invention is to provide a utility pole crossarm which may be utilized in original crossarm installations and which may be also readily utilized as a replacement for conventional wooden crossarms. Another object of this invention is to provide a utility pole crossarm which is of light weight construction, but amply strong and which will be non-conductive in nature.

Yet another object of this invention is to provide a utility pole crossarm including structural features which render it not adversely effected by temperature and moisture conditions.

A final object of this invention to be specifically enumerated herein is to provide a utility pole crossarm in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary perspective view of the upper portion of a utility pole with a fiberglass crossarm constructed in accordance with the present invention supported from the utility pole in a conventional manner;

FIG. 2 is an enlarged transverse vertical sectional view taken substantially upon the plane indicated by the section line 2—2 of FIG. 1;

FIG. 3 is a fragmentary horizontal sectional view taken substantially upon the place indicated by the section line 3—3 of FIG. 2; and FIG. 4 is a fragmentary exploded perspective view of the crossarm.

DETAILED DESCRIPTION OF THE INVENTION

Refering now more specifically to the drawings, the numeral 10 generally designates a conventional form of utility pole. A crossarm referred to in general by the reference numeral 12 and constructed in accordance with the present invention is supported from the upper portion of the utility pole 10 in a conventional manner.

With attention now invited more specifically to FIGS. 2, 3 and 4 of the drawings, it may be seen that the crossarm 12 comprises an elongated horizontal log 14 of fiberglass honeycomb material defining side-by-side upstanding adjacent individual cells 16 substantially entirely throughout the log 14. The log proper is constructed of fiberglass material and is marketed under the name Hexcell and is manufactured by the Hexcell Corporation of Graham, Texas.

The log 14 is enclosed within an outer covering 18 of resin impregnated fiberglass roving 20. The roving 20 is dipped into or otherwise impregnated with resin and is wrapped once about the log 14 and the roving 20 is slightly greater in length than the log 14 and is folded over the opposite ends of the log 14 in the manner in which wrapping paper is folded over the ends of a package enclosed by the wrapping paper. The outer surface of the covering 18 of resin impregnated fiberglass roving 20 is then sprayed with or dipped into fiberglass resin in order to provide an outer protective layer over the roving 20.

After the log 14 has been enclosed within the roving 20 and the latter has been covered with the aforementioned outer layer of resin, it is baked at the proper temperature and length of time to properly the harden the resin. Thereafter, the crossarm 12 is bored as at 22 and each of the bores 22 has a sleeve 24 of hard non-rusting material tightly telescoped thereinto with the sleeve 24 being substantially the same length as the corresponding bore, each of the bores 22 extending through the log 14, the outer covering 18 and the outer layer of resin applied over the covering 18. In this manner, a utility pole crossarm which is of light weight construction and insensitive to temperature and moisture conditions is provided. In addition, the crossarm 12 is more fire resistant than conventional treated wood crossarms, but the crossarm 12 may be utilized as a replacement for a wooden crossarm and be secured to the utility pole 10 in substantially the same manner as the wooden crossarm being replaced. Thus, a center horizontal bore 22 of the crossarm 12 receives a through bolt 26 therethrough and the bolt 26 extends and is secured through not only the corresponding bore 22 in the crossarm 12 but also a suitable bore (not shown) formed in the upper portion of the utility pole 10. Further, steel crossarm braces 28 are secured at their upper ends to the crossarm 12 in the conventional manner and the lower ends thereof are crossed and attached to the utility pole 10 below the crossarm 12 through the utilization of a lag bolt 30 driven into the utility pole 10.

The crossarm 12, as hereinbefore set forth, is of light weight construction and is insensitive to temperature and moisture conditions. Because of the light weight construction of the crossarm, it may be more readily shipped, handled and lifted into position after removal of a wooden crossarm which is to be replaced by the crossarm 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A fiberglass utility pole crossarm including an elongated log of fiberglass honeycomb material defining side-by-side adjacent elongated cells extending transversely of said log, a hard outer covering enclosing and bonded to the exterior surfaces of said log, said hard outer covering including an outer layer of resin impregnated fiberglass roving wrapped transversely about said log and also enclosing the opposite ends of said log, a plurality of insulator mounting bores formed through said log paralleling said cells and extending through the portions of said covering aligned with the opposite ends of said bores, and thrust sleeves tightly received in and extending through said bores as well as said portions of said covering, said thrust sleeves being adapted to receive therethrough the mounting studs of an equal number of insulators.

2. The combination of claim 1 wherein said covering extends beyond the ends of said log and is folded over and sealed relative to the log ends.

* * * * *